United States Patent
Kotre et al.

(10) Patent No.: US 6,542,798 B2
(45) Date of Patent: Apr. 1, 2003

(54) ENGINE READY SIGNAL USING PEAK ENGINE CYLINDER PRESSURE DETECTION

(75) Inventors: Stephen John Kotre, Ann Arbor, MI (US); David Lee Boggs, Bloomfield Hills, MI (US); Stephen Richard Burke, Waterford, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 26 days.

(21) Appl. No.: 09/729,986

(22) Filed: Dec. 6, 2000

(65) Prior Publication Data

US 2002/0068999 A1 Jun. 6, 2002

(51) Int. Cl.$^7$ .................... G01M 15/00; F02M 51/00
(52) U.S. Cl. ........................... 701/22; 180/65.1
(58) Field of Search .................. 701/22; 180/65.1, 180/65.2, 65.3, 65.4, 65.8

(56) References Cited

U.S. PATENT DOCUMENTS

| 4,327,352 A | | 4/1982 | Cerruti |
| 4,889,094 A | | 12/1989 | Beyer et al. |
| 4,944,271 A | * | 7/1990 | Iwata et al. ............ 123/406.41 |
| 5,024,082 A | * | 6/1991 | Ohkubo et al. ............ 123/435 |
| 5,069,183 A | | 12/1991 | Nagano et al. |
| 5,076,098 A | * | 12/1991 | Miwa .................... 73/115 |
| 5,359,883 A | * | 11/1994 | Baldwin et al. ........... 73/117.3 |
| 5,372,101 A | | 12/1994 | Hoshiba et al. |
| 5,601,058 A | | 2/1997 | Dyches et al. |
| 5,604,303 A | * | 2/1997 | Tomisawa et al. ......... 73/117.3 |
| 5,826,671 A | * | 10/1998 | Nakae et al. ............. 180/85.2 |
| 5,893,897 A | | 4/1999 | Volkart et al. |
| 5,909,724 A | | 6/1999 | Nishimura et al. |
| 6,009,369 A | | 12/1999 | Boisvert et al. |
| 6,018,198 A | * | 1/2000 | Tsuzuki et al. ............ 290/17 |
| 6,089,077 A | * | 7/2000 | Daniels ................... 73/35.08 |

FOREIGN PATENT DOCUMENTS

| DE | 4437286 A1 | * | 4/1995 | .......... F02B/77/08 |
| JP | 7-317586 | | 10/1995 | |
| JP | 7-286546 | | 12/1995 | |

OTHER PUBLICATIONS

Martychenko, "A Study on the Possibility of Estimation in In–Cylinder Pressure by Means of Measurement of Spark Gap Breakdown Voltage," SAE 1999–01–1115 (1999).
Forster, "Iron Current Sensing for Spark Ignition Engines," SAE 1999–01–0204 (1999).
Yuichi, "Spark Plug Voltage Analysis for Monitoring Combustion in an Internal Combustion Engine," Journal of the Society of Automotive Engineers of Japan, V 47, p. 32 (1993).

* cited by examiner

*Primary Examiner*—Michael J. Zanelli
*Assistant Examiner*—Eric M Gibson
(74) *Attorney, Agent, or Firm*—Brooks & Kushman; Carlos L. Hanze

(57) ABSTRACT

The present invention provides a method and system for determining "engine on" status in a Hybrid Electric Vehicle. A controller determines that the engine is necessary and then checks the current "engine on" status. If the engine is not currently running, the controller proceeds to start the engine by commanding the generator to spin or "motor" the engine. The controller then starts fuel and spark within the engine to create combustion. Measuring devices are then used to determine the ion current/breakdown voltage across a spark gap in the engine. The controller receives this measurement and determines whether the measured ion current/breakdown voltage exceeds a calibratable threshold. If the calibratable threshold is exceeded, combustion is occurring and the engine is on. The controller then turns on the "engine on" status flag.

13 Claims, 2 Drawing Sheets

ENGINE READY SIGNAL USING PEAK ENGINE CYLINDER PRESSURE DETECTION

BACKGROUND OF THE INVENTION

1. Field of the Invention

The present invention relates generally to a Hybrid Electric Vehicle (HEV), and specifically to an HEV system controller that determines "engine on" status using peak engine cylinder pressure.

2. Discussion of the Prior Art

The need to reduce fossil fuel consumption and emissions in automobiles and other vehicles powered by an Internal Combustion Engine (ICE) is well known. Vehicles powered by electric motors attempt to address these needs. However, electric vehicles have limited range and limited power capabilities and need substantial time to recharge their batteries. An alternative solution is to combine both an ICE and electric traction motor into one vehicle. Such vehicles are typically called Hybrid Electric Vehicles (HEVs). See generally, U.S. Pat. No. 5,343,970 (Severinsky).

The HEV is described in a variety of configurations. Many HEV patents disclose systems in which an operator is required to select between electric and internal combustion operation. In other configurations, the electric motor drives one set of wheels and the ICE drives a different set.

Other, more useful, configurations have developed. For example, a Series Hybrid Electric Vehicle (SHEV) configuration is a vehicle with an engine (most typically an ICE) connected to an electric motor called a generator. The generator, in turn, provides electricity to a battery and another motor, called a traction motor. In the SHEV, the traction motor is the sole source of wheel torque. There is no mechanical connection between the engine and the drive wheels. A parallel Hybrid Electrical Vehicle (PHEV) configuration has an engine (most typically an ICE) and an electric motor that together provide the necessary wheel torque to drive the vehicle. Additionally, in the PHEV configuration, the motor can be used as a generator to charge the battery from the power produced by the ICE.

A parallel/Series Hybrid Electric Vehicle (PSHEV) has characteristics of both PHEV and SHEV configurations and is typically known as a "powersplit" configuration. In the PSHEV, the ICE is mechanically coupled to two electric motors in a planetary gearset transaxle. A first electric motor, the generator, is connected to a sun gear. The ICE is connected to a carrier. A second electric motor, a traction motor, is connected to a ring (output) gear via additional gearing in a transaxle. Engine torque powers the generator to charge the battery. The generator can also contribute to the necessary wheel (output shaft) torque. The traction motor is used to contribute wheel torque and to recover braking energy to charge the battery if a regenerative braking system is used.

The desirability of combining an ICE with an electric motor is clear. The ICE's fuel consumption and emissions are reduced with no appreciable loss of vehicle performance or range. Nevertheless, there remains a substantial opportunity to develop ways to optimize HEV operation.

On such area of development is determining if the engine is on. In a conventional vehicle, "engine on" status can be easily determined after "key on" by comparing the actual engine speed to a threshold value that indicates the engine is producing torque and combustion. It can also be determined by simply listening for engine noise or feeling engine vibration. However, in an HEV the engine may not be running after "key on" and sometimes not even when the vehicle is in motion. Therefore, it becomes necessary for the Vehicle System Controller (VSC) to identify "engine on" status before making powertrain torque determinations.

The prior art has disclosed systems to determine whether the engine is on. Unfortunately, these systems often relate specifically to conventional ICE vehicles. For example, in U.S. Pat. No. 5,372,101 to Hishiba, et al., engine speed is measured to determine if the engine is starting or running. This method would not work with an HEV because the HEV's generator can spin the engine without combustion occurring. Therefore, engine speed in this situation would not be a reliable measurement of "engine on" status in an HEV.

In U.S. Pat. No. 5,601,058 to Dyches, et al., a method of measuring starter motor current is disclosed and in U.S. Pat. No. 6,009,369 to Boisurart, et al., a method of measuring alternator voltage is disclosed to determine if the engine is running. These two methods are also inapplicable to the HEV because the HEV does not use a conventional starter motor or alternator.

A possible solution to determine "engine on" status in an HEV is to use peak engine cylinder pressure measurement that is known in the prior art. Ion current/breakdown voltage correlates to the density of gas in the combustion chamber and in-cylinder pressures. The density of the gas is controlled by the throttle plate position, which is already known by the powertrain controller through other sensors. Therefore, peak in-cylinder pressure is a function of temperature only (assuming density is roughly known), and the temperature spikes dramatically when combustion takes place. When the powertrain controller for all cylinders infers this spike in temperature and pressure, it can be assumed that the engine is "running" under its own power.

Several articles discuss this general correlation. See A. A. Martychenko, et al., *A Study on the Possibility of Estimation of In-Cylinder Pressure by Means of Measurement of Spark Gap Breakdown Voltage*, SAE 1999-01-1115 (1999); J. Forster, et al., *Ion Current Sensing For Spark Ignition Engines*, SAE 1999-01-0204 (1999); S. Yuichi, et al., *Spark Plug Voltage Analysis for Monitoring Combustion in an Internal Combustion Engine*, Journal of the Society of Automotive Engineers of Japan V 47, pp. 32 (1993).

Martychenko describes how to estimate peak cylinder pressure using secondary ignition voltage. Circuits monitoring spark plug gap breakdown voltage for each engine cylinder are fed into a powertrain control module (PCM). The PCM compares the breakdown voltage observed with a predetermined value to represent the occurrence of stable combustion. At that point, the PCM will set a software flag indicating that the engine has indeed "started." Martychenko also mentions a similar method of determining in-cylinder pressure based on ion current across the spark plug gap.

Although ion current/breakdown voltage is known, these articles do not incorporate the correlation process into a logic scheme of a Vehicle System Controller to determine if the engine is on and combustion is occurring in an HEV.

SUMMARY OF THE INVENTION

Accordingly, the present invention provides a method and system for determining "engine on" status in an HEV.

The HEV relies upon the generator motor to spin up or "motor" the engine. Therefore, it is not possible to measure engine speed to determine whether the engine is running. It is an object of the present invention to provide a method and apparatus to determine "engine on" status in an HEV by measuring peak engine cylinder pressure using ion current/breakdown voltage in the HEV engine. If the ion current/breakdown voltage meets a certain threshold, the Vehicle System Controller will conclude combustion is occurring and the engine is running.

The present invention provides a reliable method to determine "engine on" status by measuring the ion current/breakdown voltage across a spark plug within the engine. The ion current/breakdown voltage is then compared to a calibratable threshold. If the ion current/breakdown voltage exceeds the calibratable threshold then combustion is occurring within the engine and the engine is running. Once the VSC determines the engine is on, it can make engine torque requests.

A system to perform the above method comprises a controller, a generator, an engine, and measuring device to determine the ion current/breakdown voltage. The controller determines the need for the engine to be on, starts the engine, and then determines "engine on" status by comprising the ion current/breakdown voltage to a calibratable threshold.

DETAILED DESCRIPTION OF THE PREFERRED EMBODIMENT

Figure 1:
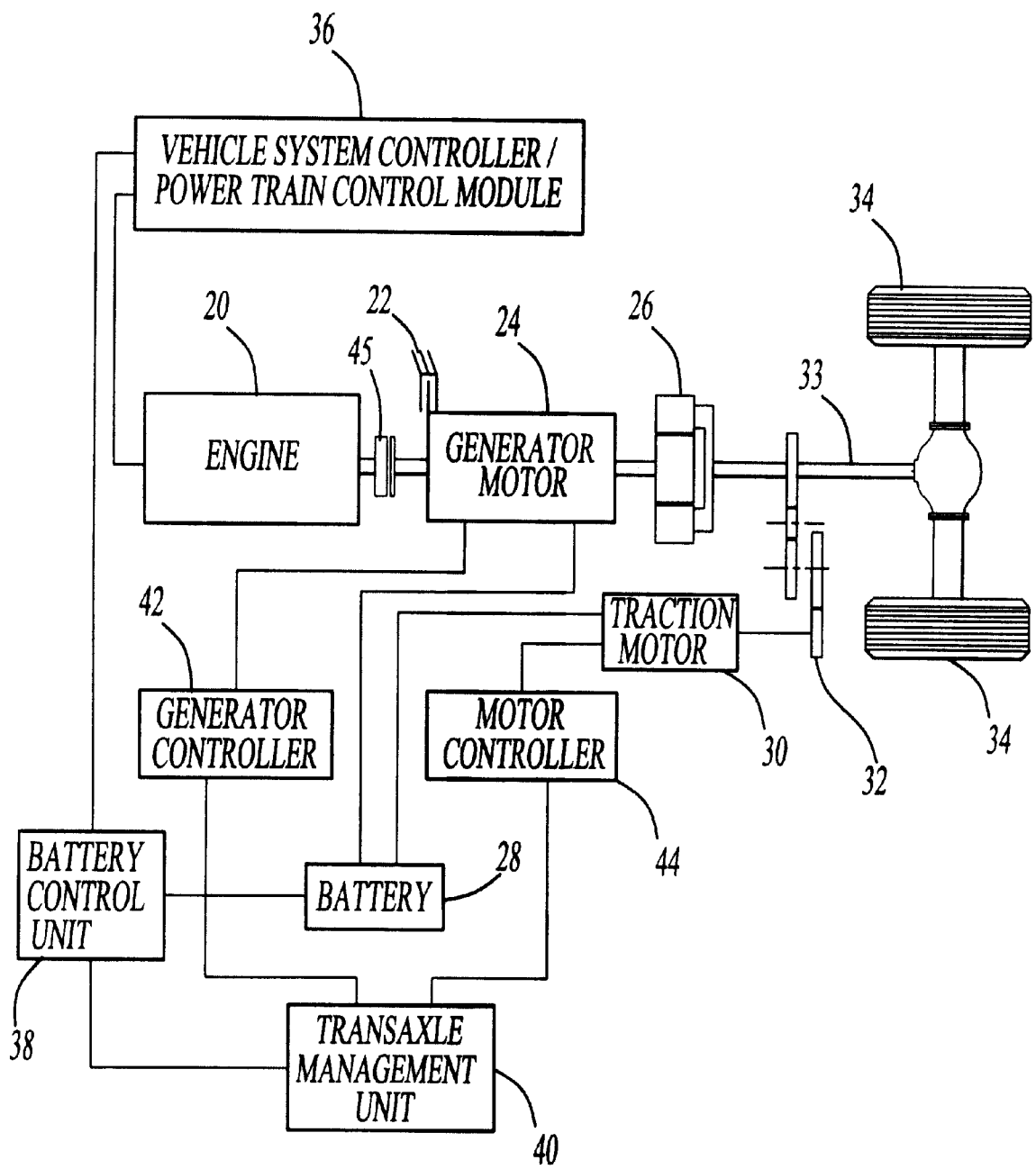
FIG. 1 illustrates a general Hybrid Electric Vehicle configuration.

The present invention relates to Electric Vehicles and, more particularly, Hybrid Electric Vehicles (HEV). FIG. 1 demonstrates just one possible configuration, specifically a Parallel/Series Hybrid Electric Vehicle (powersplit) configuration. In this HEV configuration, a Planetary Gear Set 26 mechanically couples a carrier gear to an Engine 20 via a One Way Clutch 45. The Planetary Gear Set 26 also mechanically couples a sun gear to a Generator Motor 24 and a ring (output) gear to a Traction Motor 30. The Generator Motor 24 also mechanically links to a Generator Brake 22 and is electrically linked to a Battery 28. The Traction Motor 30 is mechanically coupled to the ring gear of the planetary Gear Set 26 via a Second Gear Set 32 and is electrically linked to the Battery 28. The ring gear of the planetary Gear Set 26 is mechanically coupled to Drive Wheels 34 via an Output Shaft 33.

The Planetary Gear Set 26, splits the Engine 20 output energy into a series path from the Engine 20 to the Generator Motor 24 and a parallel path from the Engine 20 to the Drive Wheels 34. Engine 20 speed can be controlled by varying the split to the series path while maintaining a mechanical connection through the parallel path. The Traction Motor 30 augments the Engine 20 power to the Drive Wheels 34 on the parallel path through the Second Gear Set 32. The Traction Motor 30 also provides the opportunity to use energy directly from the series path, essentially running off power created by the Generator Motor 24, thereby reducing losses associated with converting energy into and out of chemical energy in the Battery 28.

A Vehicle System Controller (VSC) 36 controls many components in this configuration. The VSC 36 operates all the vehicle's main components by connecting to each component's controllers. In this illustrative embodiment, the VSC 36 also contains a powertrain Control Module (PCM).

The VSC and the PCM, though housed in the same unit in this illustrative embodiment, are actually separate controllers and can be housed in their own modules.

The VSC 36 connects to the Engine 20 via a hardwire interface. The VSC 36 is also connected to a Battery Control Unit (BCU) 38, and a Transaxle Management Unit (TMU) 40 through a Communication Network (Controller Area Network, or CAN, for example). The BCU 38 is then connected to the Battery 28 via a hardwire interface. The TMU 40 controls the Generator Motor 24 and Traction Motor 30 via the hardwire interface.

The VSC 36 determines the required Drive Wheel 34 or Output Shaft 33 torque and makes appropriate Engine 20 and Traction Motor 30 torque requests. Involving the Engine 20 in the delivery of the desired Drive Wheel 34 or Output Shaft 33 torque requires the engine to be on and making combustion. Therefore, the VSC 36 must know if the Engine 20 is on and combusting before the torque request is made. Since the Engine 20 is not always on, a method to determine "engine on" status is needed.

Figure 2:
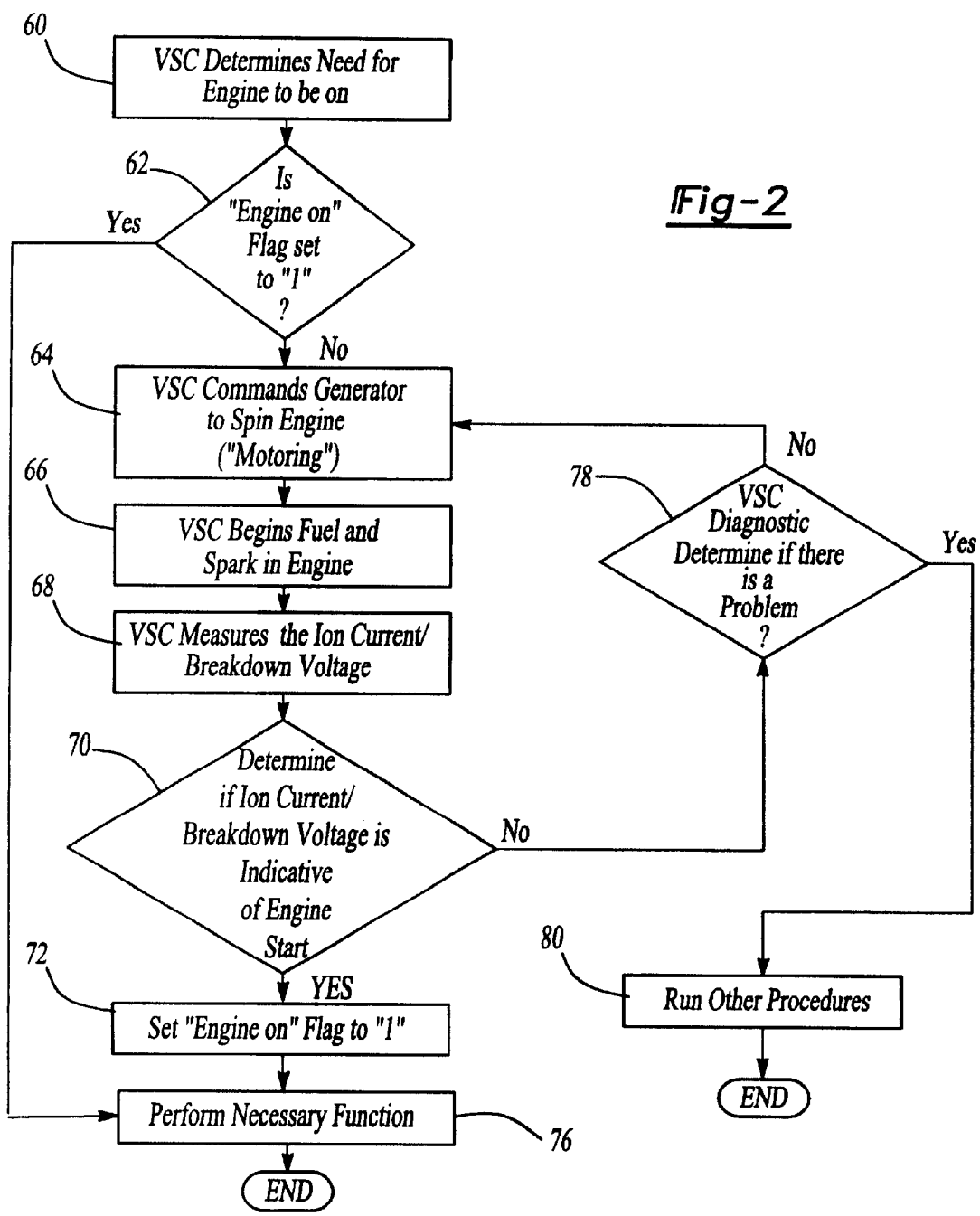
FIG. 2 illustrates a flow chart demonstrating the controller process.

The present invention addresses this need and provides the VSC 36 with the way to determine "engine on" status before the VSC 36 makes the torque request. FIG. 2 is a flow diagram demonstrating how the VSC 36 determines "engine on" status. At Step 60, the VSC 36 determines if Engine 20 is needed.

At Step 62, the VSC 36 checks the "engine on" status flag in its logic. If the flag is set to "1," the Engine 20 is already running and the VSC can proceed to Step 76 and perform the necessary function (i.e., make the Engine 20 torque request). If the "engine on" flag is set to "0," indicating the Engine 20 is not on, the VSC 36 must start the Engine 20 before proceeding.

At Step 64, the VSC 36 commands the Generator Motor 24 to spin the Engine 20 up, commonly referred to as "motoring." The VSC 36 then begins Engine 20 fueling and sparking at Step 66 to facilitate Engine 20 combustion. At Step 68, the VSC 36 measures ion current/breakdown voltage across a spark plug gap.

After the ion current/breakdown voltage is measured, the VSC 36 determines if the value indicates the Engine 20 has started and is making combustion at Step 70. If the ion current/breakdown voltage meets some calibratable threshold, then combustion is presumed occurring and the Engine 20 is determined "on." Specifically, the ion current/breakdown voltage depends on the temperature, pressure, and density of gas in a combustion chamber. A strong correlation exists among measured breakdown voltages, in-cylinder pressure, and subsequent combustion. Measuring the ion current/breakdown voltage for threshold levels correlates to combustion in the Engine 20.

If ion current/breakdown voltage meets the threshold requirements, the VSC 36 determines combustion is occurring and the "engine on" flag is set to "1" at Step 72. The VSC then performs its normal and necessary function at 76 of partitioning a portion of the desired Drive Wheel 34 or Output Shaft 33 torque request to the engine and electric motors.

If the ion current/breakdown voltage does not meet the required threshold at Step 70, VSC 36 diagnostics, at Step 78, determines if any problems, such as Generator Motor 24 failure, exist. If no problems are detected, the VSC 36 continues to attempt Engine 20 start by returning to Step 64. If a problem is detected, the VSC 36 runs appropriate procedures at Step 80.

We claim:

1. A method of determining whether an internal combustion engine is on, comprising:
   calibrating a controller with a threshold ion current/breakdown value;
   measuring peak engine cylinder pressure by measuring an ion current/breakdown voltage across a spark plug of the engine, and sending an ion current/breakdown signal to the controller; and
   comparing the ion current/breakdown signal to the threshold ion current/breakdown value by the controller to determine if engine combustion is occurring.

2. The method of claim 1 wherein measuring peak engine cylinder pressure comprises measuring secondary engine voltage.

3. The method of claim 1 wherein the vehicle is a Hybrid Electric Vehicle.

4. The method of claim 1 further comprising turning on an "engine on" status flag if the measured peak engine cylinder pressure exceeds the calibratable threshold.

5. A system for determining whether a vehicle's internal combustion engine is on in a hybrid electric vehicle having a generator, comprising:
   a controller for managing operation of the engine and the generator;
   a measuring device for determining whether cylinder pressure has reached a peak level; and
   wherein the controller determines if the engine needs to be turned on based upon the determination by the measuring device as to whether the cylinder pressure has reached the peak level.

6. The system of claim 5 wherein the peak engine cylinder pressure comprises ion current/breakdown voltage across a spark plug.

7. The system of claim 5 wherein the peak engine cylinder pressure comprises engine secondary ignition voltage.

8. The system of claim 5 wherein the controller determines if the engine is on by checking an "engine on" flag within its logic.

9. The system of claim 5 wherein the controller starts the engine if the measuring device sets an "engine on" flag indicating that the engine is not on.

10. The system of claim 9 wherein the controller starts the engine with a first command to the generator to spin up the engine, and a second command to start fueling and sparking within the engine.

11. The system of claim 5 wherein the controller turns on an "engine on" flag if engine combustion is occurring.

12. A system for determining whether a vehicle's internal combustion engine is on in a hybrid electric vehicle having a generator, comprising:
   a controller for managing operation of the engine and the generator; and
   a measuring device for determining whether cylinder pressure has reached a peak level by measuring ion current/breakdown voltage from the measuring device and comparing the measured ion current/breakdown voltage to a calibrated threshold to determine if engine combustion is occurring.

13. A method of determining in a hybrid electric vehicle having an internal combustion engine and a generator whether the internal combustion engine is operational, comprising:
   calibrating a controller with a threshold value;
   measuring peak engine cylinder pressure by measuring a voltage across a spark plug of the engine, and sending a signal representative of the voltage to the controller; and
   comparing the signal to the threshold value by the controller to determine if engine combustion is occurring.

* * * * *